United States Patent Office 3,106,419
Patented Oct. 8, 1963

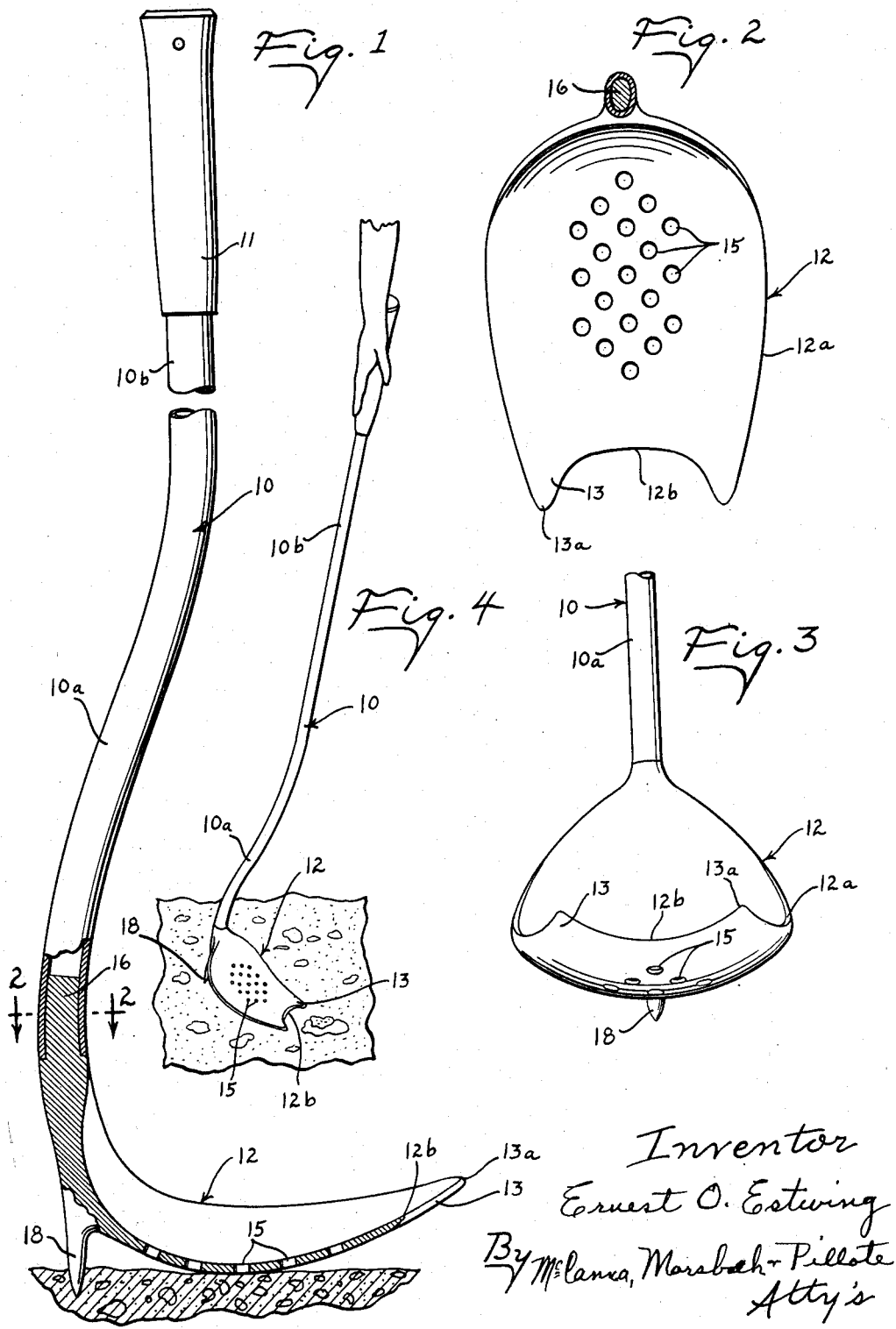

3,106,419
GATHERING DEVICE FOR SEMI-PRECIOUS STONES
Ernest O. Estwing, Rockford, Ill., assignor to Estwing Manufacturing Company, Incorporated, Rockford, Ill., a corporation of Illinois
Filed Oct. 12, 1960, Ser. No. 62,233
3 Claims. (Cl. 294—2)

This invention relates to a scoop device for use in gathering semi-precious stones, rocks and the like.

The gathering of stones and rocks by amateur rock collectors for subsequent cutting and/or polishing, is becoming an increasingly popular pastime. However, at present, the gathering of stones necessitates stooping and bending when loosening and picking up the stones. When it is considered that only a small fraction of all of the stones picked up are retained after the initial somewhat cursory examination, it is manifest that the gathering of such stones presently entails considerable effort. Moreover, the stones are frequently in relatively inaccessible places, such as under the water along the banks of streams and lakes; under bushes; under overhanging rocks, or buried in whole or in part in the ground.

It is a general object of the present invention to provide a scoop device of general utility in the gathering of stones and which is adapted for use in picking up stones when the user is standing erect to eliminate the necessity of bending or stooping; which can be used to grub out stones from loose sand and rock; pry loose small pieces of rock; and gather stones from under bushes and under water in streams and along the seashore.

Another object of this invention is to provide a scoop device in accordance with the foregoing objects, and which is constructed and arranged to also function as a hook for engagement with overhanging ledges, roots and the like to aid the user in climbing and descending to the relatively less accessible places during the gathering of stones.

A further object of this invention is to provide a scoop device in accordance with the foregoing objects which is also adapted for use as a cane to aid the user, particularly when climbing and descending, and which cane can be used in soft sand as well as on hard ground.

These, together with various ancillary objects and advantages of this invention will be more readily appreciated as the same become better understood by reference to the following detailed description when taken in connection with the accompanying drawings wherein:

FIGURE 1 is a partial side elevational view of the device with parts broken away and shown in section to illustrate details of construction;

FIG. 2 is a horizontal sectional view through the shank of the scoop device taken on the plane 2—2 of FIGURE 1 and showing a plan view of the scoop blade;

FIG. 3 is a fragmentary front view of the scoop device; and

FIG. 4 is a perspective view of the device illustrating the use of the same in gathering stones.

The present application is a continuation-in-part of my copending application Serial No. 863,342, filed December 31, 1959, and now abandoned.

The scoop device of the invention includes an elongated handle 10 having a hand grip 11 at one end and a scoop-like blade 12 extending transverse to the other end of the handle. The blade 12 has a concavo-convex configuration to form a dish-shaped body having a concave side facing in the direction of the handle 10 to provide a pocket for receiving the stones. The dished blade has a sharpened forward edge 12b and a pair of spaced prongs 13 which project forwardly therefrom in a smooth continuous curve, as best shown in FIGS. 1 and 2. The prongs 13 are disposed at opposite sides of a medial plane extending fore and aft of the blade and the prongs are sharpened at their forward tips 13a to facilitate digging, grubbing and raking of the stones to loosen them from the earth and rocks. In addition, the spaced prongs 13 form a guideway therebetween for guiding the stones into the dish-shaped blade 12, when the blade is drawn over the surface in the manner shown in FIGURE 1. It will additionally be noted that the tool is also adapted to be employed for prying loose stones and small pieces of rock. In the latter use of the tool, the prongs engage the stones or rocks to be loosened and the convex underside of the blade forms a fulcrum for the tool to pry the stone loose. The opposed side edges 12a of the blade are preferably arched outwardly, as viewed in plan (see FIG. 2), to provide a lip at each side of the blade which facilitates scooping of stones and rocks into the blade from the side thereof. A plurality of small holes 15 are preferably provided in the central portion of the blade to drain liquid and fine sand from the dished blade, when the scoop device is used to remove stones lying under water.

The blade and handle may be formed of any material which will provide the requisite strength and durability necessary for use of the tool in prying, digging and the like, and the blade may be formed integrally with the handle 10 or attached thereto in any desired manner. The handle 10 is preferably tubular in cross-section to provide a light weight and rigid structure and, as best shown in FIGURE 2, has an oblate cross-section with its major transverse axis disposed in a plane through the center of the blade 12, to provide improved strength and to also minimize the extent to which the handle obstructs the user's view of the blade and its contents when picking up stones. The blade may be attached to the handle in various different ways. However, in the preferred form of the invention, the blade has an integral tang 16 formed thereon to extend upwardly from the rear edge of the blade remote from the prongs 13. The tang extends into the lower portion of the tubular handle 10 and is brazed or otherwise rigidly secured thereto. In the preferred form of the invention, the lower portion of the handle 10, designated by the numeral 10a, is secured rearwardly as best shown in FIG. 1 so that the blade 12 is approximately centered with respect to the centerline of the upper portion 10b of the handle. Consequently, when lifting the scoop device to enable closer viewing of the stones in the blade 12, there is no tendency of the stones to tilt the scoop device and become prematurely ejected from the blade. The hand grip 11 at the upper portion of the handle 10 may be of any suitable construction. Conveniently, the grip may be molded on to the upper end of the handle from the resilient plastic material or the like to provide a soft comfortable grip.

The scoop device is also adapted for use as a cane or staff to provide a supplementary support, particularly when climbing or descending hills. For this purpose, a spur 18 is formed on the blade 12 and extends from the convex side thereof. The spur is located adjacent the rear edge of the blade 12 so as to not interfere with normal use of the blade as a stone scoop, and the spur is preferably disposed in approximate alignment with the lower end of the handle 10 so that pressure applied to the handle will force the spur into the ground. As shown in FIGS. 1 and 3, the spur extends below a plane through the underside of the blade 10 and, when the spur is forced into the ground, the blade engages the surface of the ground to limit the depth of penetration into the ground. This is of particular importance on soft sand and the like.

From the foregoing it is thought that the construction and use of the tool is readily understood. The handle 10 is made sufficiently long to enable the user to pick up stones or rocks S from the ground when the user is standing erect, by merely drawing the scoop-like blade 12 toward the stone in the manner shown in FIG. 4. If the stones or pebbles are lying at the bottom of a pool of water, it is apparent that the scoop device can be extended into the water to pick up the desired stones, without necessitating the user immersing his hand in the water. When the scoop is elevated above the water, any excess water and fine sand drains through the holes 15. The long handle also enables the blade to be extended under bushes, overhanging ledges and the like to facilitate gathering stones from these relatively inaccessible areas.

The scoop device is also made sufficiently strong to adapt the tool for prying stones or rocks loose. The prongs 13 of the tool engage the stone and the scoop device fulcrums about the convex side of the blade 12 to loosen or break off pieces of rock. Further, the hook-like configuration of the blade 12 also adapts the same to hook onto boulders, rocks or overhanging ledges to aid the rock collector when climbing or descending relatively steep embankments. When climbing or descending hills, the scoop device can also be used as a cane by forcing the spur 18 into the ground and using the handle as a supplementary support. When the scoop device is used in this manner, the blade functions to limit the depth of penetration of the spur and assures adequate support even in loose soil. Additionally, the spur can also be used to scratch in the earth and to aid in loosening small stones.

I claim:

1. A stone scoop for use in gathering stones comprising, an elongated handle having a hand grip portion at one end and a length to reach the ground when the user is in a generally erect position, a concavo-convex blade having the rear edge thereof secured to the other end of the handle and extending laterally from the handle in a direction generally perpendicular to the longitudinal axis of the handle to form an upwardly facing pocket for receiving stones when the handle is positioned upright, said blade having a forward edge and two spaced prongs extending forwardly from the forward edge and disposed at opposite sides of the front to rear centerline of the blade for loosening stones and for guiding stones into the pocket formed by the blade, said blade having at least one opening therein for passing liquid and fine particles from the pocket formed by the blade, a spur extending from the convex side of the blade adjacent the rear edge thereof, said spur extending below a plane which is tangent to the convex underside of the blade and which plane is perpendicular to the longitudinal axis of the handle to penetrate the ground when pressure is applied to the handle, said blade being adapted to engage the surface of the ground and limit penetration of the spur.

2. A stone scoop for use in gathering stones comprising, an elongated handle having a hand grip portion at one end and a length to reach the ground when the user is in a generally erect position, a concavo-convex blade having the rear edge thereof secured to the other end of the handle and extending laterally from the handle in a direction generally perpendicular to the longitudinal axis of the handle to form an upwardly facing pocket for receiving stones when the handle is positioned upright, said blade having a forward edge and spaced prongs extending forwardly from the forward edge and disposed at opposite sides of the front-to-rear centerline of the blade for loosening stones and for guiding stones into the pocket formed by the blade, said blade having at least one opening therein for passing liquid and fine particles from the pocket formed by the blade, a spur extending from the convex side of said blade adjacent the rear edge thereof, said spur extending below a plane which is tangent to the convex underside of the blade and which plane is perpendicular to the longitudinal axis of the handle to penetrate the ground when pressure is applied to the handle, said blade being adapted to engage the surface of the ground and limit penetration of the spur, said handle having a lower portion curved forwardly and upwardly from the rear edge of the blade and a generally straight upper portion, the centerline of which intersects the central portion of the concavo-convex blade.

3. The combination of claim 2 wherein said handle has an oblong cross section, the major transverse axis of which parallels the front-to-rear centerline of the blade.

References Cited in the file of this patent

UNITED STATES PATENTS

| | | |
|---|---|---|
| 457,219 | Sanford | Aug. 4, 1891 |
| 1,313,417 | Raymond | Aug. 19, 1919 |
| 1,571,062 | Peavey | Jan. 26, 1926 |
| 2,727,777 | Johnstone et al. | Dec. 20, 1955 |

FOREIGN PATENTS

| | | |
|---|---|---|
| 378,936 | Germany | Aug. 11, 1923 |